(12) United States Patent
Thoukydides et al.

(10) Patent No.: US 9,590,747 B2
(45) Date of Patent: Mar. 7, 2017

(54) RF LOOPBACK VIA ANTENNA COUPLING FOR CALIBRATION OF MULTIPLE TRANSCEIVER SYSTEMS

(71) Applicant: Samsung Electronics Co., Ltd., Gyeonggi-do (KR)

(72) Inventors: Alexander Thoukydides, Cambridgeshire (GB); Augustine Lytan, Cambridgeshire (GB)

(73) Assignee: Samsung Electronics Co., Ltd (KR)

( * ) Notice: Subject to any disclaimer, the term of this patent is extended or adjusted under 35 U.S.C. 154(b) by 15 days.

(21) Appl. No.: 14/218,179

(22) Filed: Mar. 18, 2014

(65) Prior Publication Data

US 2015/0118970 A1   Apr. 30, 2015

Related U.S. Application Data

(60) Provisional application No. 61/897,591, filed on Oct. 30, 2013.

(51) Int. Cl.
*H04B 17/00* (2015.01)
*H04B 17/21* (2015.01)
*H04B 17/14* (2015.01)

(52) U.S. Cl.
CPC ............ *H04B 17/21* (2015.01); *H04B 17/14* (2015.01)

(58) Field of Classification Search
CPC ......... H04B 17/00; H04B 17/11; H04B 17/14
USPC ............................................. 455/67.11, 67.14
See application file for complete search history.

(56) References Cited

U.S. PATENT DOCUMENTS

| 6,693,588 | B1* | 2/2004 | Schlee | H01Q 3/267 |
| | | | | 342/165 |
| 6,728,517 | B2* | 4/2004 | Sugar | H04B 1/005 |
| | | | | 455/272 |
| 2004/0048611 | A1* | 3/2004 | Schreiber | H04B 17/17 |
| | | | | 455/423 |
| 2004/0171408 | A1* | 9/2004 | Maruta | H01Q 3/26 |
| | | | | 455/562.1 |
| 2006/0223558 | A1* | 10/2006 | Behzad | H04B 1/0082 |
| | | | | 455/502 |
| 2009/0227214 | A1* | 9/2009 | Georgantas et al. | 455/86 |
| 2011/0292978 | A1* | 12/2011 | Kravitz | 375/221 |
| 2013/0052964 | A1* | 2/2013 | Husted | H04B 17/11 |
| | | | | 455/73 |

\* cited by examiner

*Primary Examiner* — Ayodeji Ayotunde
(74) *Attorney, Agent, or Firm* — The Farrell Law Firm, P.C.

(57) ABSTRACT

A method, device, and system for calibrating one or more transceiver components in a multi-transceiver system are provided. The method includes sending a calibration signal through a transmit path of a first transceiver of the multi-transceiver system, resulting in transmission of the calibration signal from an antenna of the first transceiver; receiving, by an antenna of a second transceiver of the multi-transceiver system, the transmitted calibration signal, and processing the received calibration signal through a receive path of the second transceiver; and calibrating one or more components of the multi-transceiver system using the received and processed calibration signal.

34 Claims, 2 Drawing Sheets

RF LOOPBACK VIA ANTENNA COUPLING FOR CALIBRATION OF MULTIPLE TRANSCEIVER SYSTEMS

PRIORITY

The present application claims priority under 35 U.S.C. §119(e) to U.S. Provisional Application No. 61/897,591, entitled "RF Loopback via Antenna Coupling for Calibration of Multiple Transceiver Systems," which was filed on Oct. 30, 2013, the content of which is incorporated herein by reference.

BACKGROUND OF THE INVENTION

1. Field of the Invention

The present invention relates generally to the calibration of multiple transceiver systems and more particularly to calibrating aspects of two or more transceivers without requiring dedicated circuits.

2. Description of the Related Art

Most radio transceivers require some form of calibration to compensate for variations in characteristics between the devices/systems of which they are a part, variations that occur over time, and variations due to their operating conditions/environment. Such calibration is necessary to maintain compliance with relevant standards, specifications and regulatory requirements, as well as necessary to maximise their performance. It is desirable for as much of this calibration as possible to be performed automatically by the device itself, without requiring any special external equipment or user interaction. This is especially true for consumer products such as mobile phones and routers where performing calibrations as part of the production process increases cost, and the end user will expect the device to "just work".

Furthermore, more and more electronic products incorporate multiple independent (or mostly independent) radio transceivers. For example, most IEEE 802.11n or IEEE 802.11ac systems/devices (other than some small form factor handheld devices like mobile phones) utilize multiple antennas to improve throughput and range using Multiple Input Multiple Output (MIMO) techniques, where each antenna is connected to its own dedicated transceiver.

Two approaches are commonly used to perform calibrations in multi-transceiver systems/devices:
1) Inject and/or measure signals at appropriate points within the signal path of the receiver and/or transmitter that is being calibrated. This is typically done with dedicated Analog-to-Digital Convertors (ADCs), Digital-to-Analog Convertors (DACs), or oscillators that are used only for calibration purposes.
2) Looping back ("loopback") the signal from the transmit path of the transmitter into the receive path of the receiver. This is often done at multiple points along the transmit and receive paths, such as from the DACs to the ADCs, and from the output of the transmit mixer to the input of the receive mixer.

Both of these approaches require dedicated hardware, which increases the design effort and the cost of the product (e.g., increased silicon area for the case of an Integrated Circuit (IC) implementation). More importantly, these approaches typically do not support full calibration of the final stages of the transmitter (such as, notably, the Power Amplifier (PA)), the first stages of the receiver (such as, e.g., the Low Noise Amplifier (LNA)), or any off-chip external components.

For example, a commonly deployed loopback approach is to loop the signal from near the end of the transmit path back into either the receive path of the same transceiver or dedicated calibration circuits. Loopback into the receiver is usually only implemented for the final stage within a particular Integrated Circuit (IC), so for a device with an external Power Amplifier (PA) it would normally exclude using the loopback for calibrating the gain steps or distortion characteristics of the PA itself. Loopback via dedicated calibration circuits usually has significantly reduced bandwidth (or a high implementation cost for full bandwidth), e.g. the signal from an external PA would normally be measured by a low frequency peak detector or power detector, which again is unsuitable for calibrating the PA's distortion characteristics. Moreover, these dedicated calibration circuits also suffer from variable and non-ideal characteristics. Taking the example of PA peak detectors, they typically have a response that is non-linear with output power, and that varies between devices, with temperature and with RF frequency.

Thus, there is a need for an approach to calibrating radio transceivers, including their final/first stages, in multiple transceiver devices/systems without requiring additional hardware.

SUMMARY OF THE INVENTION

Accordingly, the present invention is designed to address at least the problems and/or disadvantages described above and to provide at least the advantages described below. In one aspect, the present invention provides an approach to calibrating transceiver components in a multi-transceiver system/device using a feedback loop and without requiring dedicated circuits and/or additional hardware. In another aspect, the present invention provides an approach to calibrating transceiver components, including components in the final/first stages of the transmit/receive paths of individual transceivers, in multiple transceiver devices/systems without requiring dedicated circuits and/or additional hardware. In yet another aspect, the present invention provides an approach to calibrating transceiver components in a single antenna multiple transceiver devices/systems without requiring dedicated circuits and/or additional hardware.

According to one aspect of the present invention, a method for calibrating one or more transceiver components in a multi-transceiver system is provided, including: sending a calibration signal through a transmit path of a first transceiver of the multi-transceiver system, resulting in transmission of the calibration signal from an antenna of the first transceiver; receiving, by an antenna of a second transceiver of the multi-transceiver system, the transmitted calibration signal, and processing the received calibration signal through a receive path of the second transceiver; and calibrating one or more components of the multi-transceiver system using the received and processed calibration signal.

According to another aspect of the present invention, a multi-transceiver device is provided, including: a first transceiver comprising a transmit path; a second transceiver comprising a receive path; and one or more processors configured to control transmission on the transmit path of the first transceiver and reception on the receive path of the second transceiver; and at least one non-transitory computer-readable medium having program instructions recorded thereon, the program instructions configured to have the one or more processors perform the steps of: sending a calibration signal through the transmit path of the first transceiver, resulting in transmission of the calibration signal from an antenna; receiving and processing the transmitted calibration signal through the receive path of the second transceiver; and calibrating one or more components of the multi-transceiver system using the received and processed calibration signal.

BRIEF DESCRIPTION OF THE DRAWINGS

The above and other aspects, features, and advantages of embodiments of the present invention will be more apparent from the following detailed description taken in conjunction with the accompanying drawings, in which.

DETAILED DESCRIPTION OF EMBODIMENTS OF THE INVENTION

Figure 1:
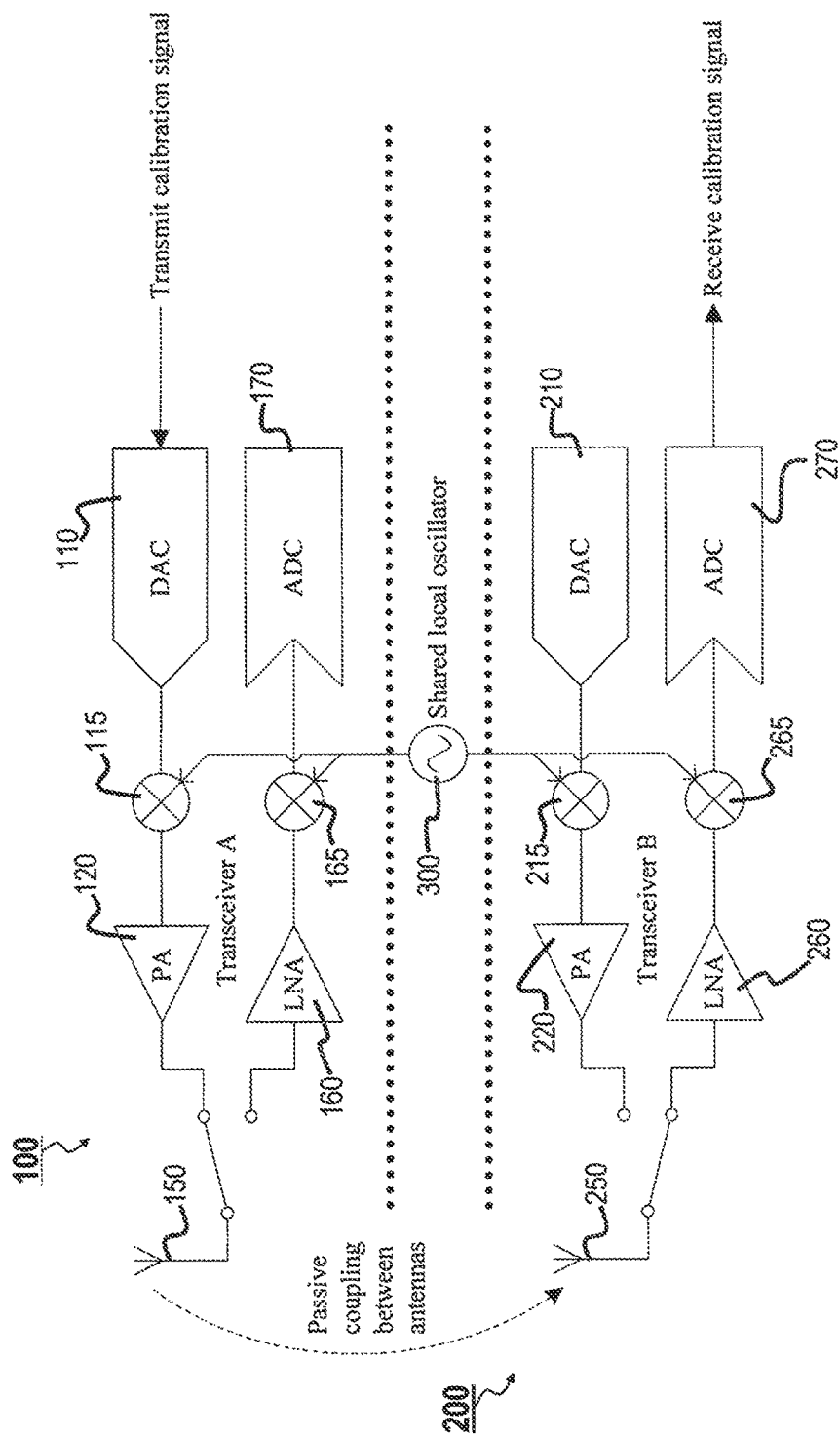
FIG. 1 is a block diagram showing a multiple transceiver system being calibrated according to an embodiment of the present invention.

One or more embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

According to embodiments of the present invention, any electronic systems incorporating multiple transceivers can exploit the inherent radiofrequency (RF) coupling between their antennas by measuring the signal transmitted by the transmitter of one transceiver using the receiver of a different transceiver. This provides a loopback path that can test the entirety of the circuit paths for both the transmitters and receivers without requiring additional hardware. Embodiments of the present invention can be used to calibrate a transmitter of a transceiver by making measurements of its behaviour using the receiver, or to calibrate the receiver by generating calibration signals via the transmitter.

Advantages of embodiments of the present invention include, but are not limited to, the following:

The complete transmitter and receiver are included in the calibration. Non-linearities can be directly measured and calibrated.

No dedicated hardware is required to support the calibrations, especially for calibration of off-chip components. Some dedicated calibration circuits that would traditionally be used may be removed.

The second transceiver being used for the calibration will generally be of higher quality than circuits that are included just for calibration purposes, thereby allowing more accurate measurements over higher bandwidths and with better linearity.

In some embodiments, if one of the transceivers is not being used for its normal purpose, e.g. when a MIMO device is operating in Single Input Single Output (SISO) mode, then the receiver in the spare transceiver can also be used to continuously monitor and dynamically adapt the transmitters that are currently being used.

Embodiments of the present invention do not need dedicated circuits to perform calibration, nor to implement the loopback path used for calibration. The embodiments of the present invention use the inherent RF coupling between otherwise independent transceivers to enable a pair of transceivers to calibrate aspects of each other (including external components thereto).

Moreover, the calibration signal used in embodiments of the present invention can be distinguished from other interference that might be picked up by the receiver during the calibration. This is true whether the calibration signal used is either a dedicated calibration signal or a standard modulation for the protocol being implemented.

Further still, as stated above, when one of the transceivers is not being used for its normal purpose, its receiver can be used to dynamically monitor and adapt another transmitter during its regular operation.

Although many benefits are obtained when there are links between the transceivers, such as the use of the same LO (local oscillator) for their RF mixers (which is typically the case for a MIMO implementation), the present invention is not limited to multi-transceiver systems having any such links. Similarly, although timing synchronization between the transmitter and receiver can also be utilised to correlate the loopback signal against the transmitted signal to reduce the susceptibility of the calibration to the effect of interferers, the present invention is not limited to embodiments having such timing synchronization.

FIG. 1 is a diagram showing two transceivers in a MIMO implementation, e.g. for an IEEE 802.11n or 802.11ac system, to which an embodiment of the present invention is being applied. In normal operation both transceivers will either be transmitting simultaneously or will be receiving simultaneously. The antennas will be designed to minimise coupling to achieve spatial diversity, but in small form factor products such as cellular handsets this isolation will typically be in the range of 15 to 30 dB depending on product design and how it is being used. This is adequate coupling for one transceiver operated in receive mode to pick up the signal transmitted by the other transceiver.

This embodiment of the invention utilises this (otherwise undesirable) coupling between the antennas to support calibration of the transceivers. The transfer function between the transmit and receive antennas is unpredictable, is likely to have a significant frequency dependency, will often have multi-path reflections, and will vary dynamically. Hence, calibrations performed using this technique must either be independent of signal amplitude or only use relative power level measurements on the same (or similar) frequencies made within a short time interval. Specifically, relative measurements must be made within the coherence bandwidth and coherence time of the channel between the antennas.

Product designers usually attempt to minimise the coupling between antennas. This is done both to maximise the antenna efficiency (maximise the radiated power) and maximise the independence of spatial streams transmitted/received by those antennas (maximise achievable throughput and range). This can result in significant losses between the transmitted and received calibration signal, and increases the relative amplitude of any interfering signals. However, the received calibration signal should still be significantly higher than the receiver's sensitivity and provide adequate SNR (signal to noise ratio) or SNDR (signal to noise-plus-distortion ratio) at the receive ADC for the intended calibration.

In FIG. 1, Transceiver A 100 and Transceiver B 200 share a single LO 300. Because the transceivers share the same LO, most imperfections caused by the LO will cancel out, so the looped back signal will only depend on other characteristics of the transmitter and receiver. Moreover, as mentioned above, timing synchronization between the transmitter and receiver can also be utilised to correlate the loopback signal against the transmitted signal to reduce the susceptibility of the calibration to the effect of interferers.

Transceiver A 100 comprises an antenna 150 which can be connected one of a receive and transmit path. In the transmit path (going from right to left, towards antenna 150), a digital signal for transmission is input into the Digital-to-Analog Converter (DAC) 110, which outputs an analog signal to Tx Mixer 115, which mixes the analog signal with a timing signal from the LO 300. Power Amplifier 120 takes the mixed signal and outputs it to Antenna 150 for transmission. On the receive path (going from left to right, from antenna 150), a received signal is first amplified by Low Noise Amplifier (LNA) 160, whose amplified output is mixed by Rx Mixer 165 with the timing signal from the LO 300. Analog-to-Digital Converter (ADC) 170 converts the mixed signal to a digital output for processing by digital circuits in the rest of the system.

Transceiver B 200 comprises components performing the same functions as explained above in reference to Transceiver A 100: Antenna 250; a receive path comprising LNA 260, Rx Mixer 265, and ADC 270; and a transmit path comprising DAC 210, Tx Mixer 215, and PA 220. Furthermore, in FIG. 1, Transceiver A 100 is set to transmit as shown by the connection of Antenna 150 with the transmit path, while Transceiver B 200 is set to receive as shown by the connection of Antenna 250 with the receive path.

Figure 2:
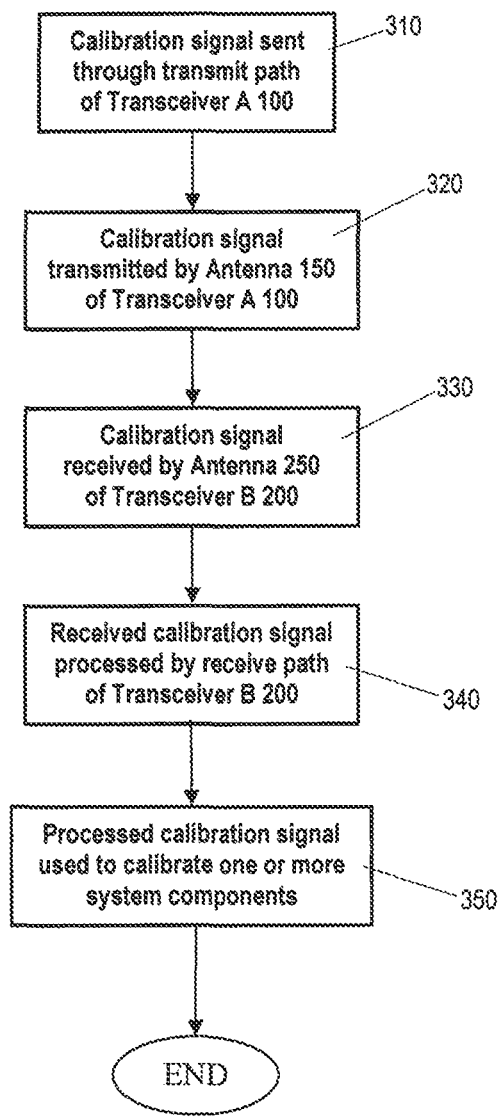
FIG. 2 is a flowchart showing a method according to an embodiment of the present invention.

Referring to FIG. 2 in conjunction with FIG. 1, a calibration signal is sent through the transmit path of the Transceiver A 100 of the multi-transceiver system in step 310. Once through, the calibration signal is transmitted from Antenna 150 of Transceiver A 100 in step 320. In step 330, Antenna 250 of Transceiver B 200 receives the transmitted calibration signal transmitted by Antenna 100 of Transceiver A 100. The received calibration signal is then processed in step 340 by and through the receive path of Transceiver B 200. Finally, in step 350, the received and processed calibration signal is used to calibrate one or more components of the multi-transceiver system. Thus, in accordance with an embodiment of the present invention, a calibration signal is sent through the transmit path of Transceiver A 100, transmitted by Antenna 150, received by Antenna 250, processed through the receive path of Transceiver B 200, and then used to calibrate one or more components of the multi-transceiver system.

Some of the calibrations that can be performed using this technique include, but are not limited to:

PA gain step size: Feed the PA with a constant amplitude input signal and measure the received signal level as the PA gain is changed. The difference in received signal level gives the size of each PA gain step. This can then be used to perform open-loop changes to the transmit power level over a wide range of power levels, which can be useful if the normal power detector only provides good accuracy over a restricted power range.

PA pre-distortion: The achievable transmit output power is typically limited by the PA linearity; the distortion introduced by attempting to transmit at higher output powers degrades the modulation accuracy and spectral mask. A common technique to increase the maximum achievable output power and PA efficiency is to pre-distort the signal provided at the PA input with the inverse of the PA transfer function. The usual approach for doing this is to directly measure the output of the PA, typically via a dedicated loopback path into part of the receiver. However, the same result can be achieved using the passive coupling between the antennas to measure the PA non-linearity via a different transceiver with lower implementation complexity and less risk of degrading the transmitted signal due to coupling introduced by the loopback path.

PA gain step phase chance: By transmitting a continuous calibration signal and monitoring the phase changes of the received signal as the PA gain is changed, the resulting phase changes can be measured. This allows the transmit output power to be varied during MIMO or beamforming operation without relying on updated channel feedback from the peer device.

Transmitter IQ mismatch: An amplitude or phase imbalance between the two quadrature signals in a Cartesian transmitter results in an image of the intended signal being generated mirrored about the LO frequency. The amount of mismatch can be determined by transmitting a calibration signal at an offset frequency from that of the LO and measuring the amplitudes of both that signal and its image via the other receiver. The gain and phase of the I and Q components can then be adjusted to minimize the relative amplitude of the image signal compared to the main signal.

Transmit filter response: The bandwidth of transmit filters (not shown) can be calibrated by transmitting calibration signals and measuring their amplitudes either side of the intended cut-off frequency. To avoid the calibration being dominated by any frequency dependency in the coupling between the antennas, the measurements need to be made within the coherence bandwidth of each other. The impact of other filters in the calibration path can be minimised by using different LO frequencies for the transmitter and receiver to place the transmit filter roll-off near the centre of the receiver's channel bandwidth. As an alternative to transmitting multiple calibration signals at different frequencies a single wide-band calibration signal can be used with the frequency response extracted by Fourier transform of the received signal.

Receiver or ADC filter frequency response: Using the same approach as for transmit filter response, any filters in the receiver can be calibrated. In this case the calibration signals should optimally be placed near the centre of the transmitter's channel bandwidth but either side of the intended cut-off of the receiver's filters.

LNA gain step size: Similar to the PA gain step size calibration, the receiver's LNA gain steps can be calibrated by transmitting a constant amplitude signal and then measuring the received signal level as the LNA gain is adjusted. To be able to make accurate relative receive signal strength measurements, one must compensate for the effects of LNA gain changes.

LNA gain step phase change: Changing LNA gain can introduce a phase change, which if it occurs after the start of modem synchronisation may require compensation. By transmitting a continuous calibration signal and monitoring the phase changes of the received signal as the gain steps are changed these phase changes can be measured.

LNA frequency tuning: LNAs often include active tuning components to optimise their gain for the frequency of the signal to be received. By transmitting a calibration signal at the appropriate frequency the tuning can be adjusted to maximise the received signal level.

Receiver IQ mismatch: Using the same approach as for the transmitter IQ mismatch, the receiver's IQ mismatch can be calibrated. However, it is not possible to calibrate both transceivers using this technique; at least one transmitter or receiver must already have its IQ mismatch calibrated by an independent method.

Mixer IIP2 estimation: Second-order distortion in the receive mixer can result in second-order intermodulation products being produced within the bandwidth of the signal to be received. This introduces a spurious response frequency at half of the receiver's IF (intermediate frequency), which in the case of a direct conversion receiver results in intermodulation products of the transmitted signal falling coincident with the wanted signal. The IIP2 can be estimated by transmitting a calibration signal at an offset from the receiver's LO frequency and then measuring the resulting IIM2 (second order input intermodulation products). The mixer parameters can then be adjusted to maximise the IIP2.

In this embodiment, the calibrations are performed with a modulated signal (which can be either a dedicated calibration signal or a standard modulation for the protocol being implemented) to reduce the effect of other RF signals during the calibration. If a modulated signal is used, most of the calibrations will use the magnitude of the correlation result as the received signal level measurement. For the specific case of the PA and/or LNA gain step phase change, it is the location of the correlation peak that provides the required measurement. However, although this embodiment uses a modulated signal, the present invention is not limited thereto, e.g., some embodiments of the present invention may use a simple carrier wave transmission to perform one or more calibrations.

Because coupling between antennas is uncontrolled in embodiments of the present invention, its effects will vary dynamically depending on the environment, including variable attenuation, frequency dependency, and multipath effects. This restricts its use to measurements that do not depend on the amplitude of the loopback signal, or to relative amplitude measurements made within a short time interval. This time interval is likely to be shorter for handheld devices like mobile phones than for fixed infrastructure devices like access points and routers.

The receiver of calibration signals according to embodiments of the present invention will also receive any other RF signals in the local environment which may interfere with calibrations. This is not a problem unique to this technique—it will affect some more traditional calibration methods too. Out of band interferers will be filtered out to some degree. The effect of any remaining interference can also be reduced using this technique by correlating the received signal against the transmitted signal.

As would be known to one of ordinary skill in the art, a variety of approaches can be used to minimise the effect of these other signals. As discussed above, transmitting a modulated calibration signal, and then correlating the received signal against the transmitted signal, is fairly effective. If the same LO is used for both transceivers (which is typically the case in MIMO systems/devices), then this correlation can be quite simple: just a time/phase shift to compensate for the propagation delay/rotation through the transmitter, between the antennas, and through the receiver. If the transceivers use different LOs, it is also necessary to compensate for the difference between their frequencies, either by direct measurement or by estimating the carrier frequency offset of the received signal. Another and/or additional approach is to repeat the calibration multiple times and discard results that suggest the presence of interference, e.g. those with higher receive power levels. Yet another approach would be to measure the received signal both with and without the calibration signal and then using the difference rather than the calibration signal itself.

Although the present invention has been discussed above in reference to the embodiment shown in FIG. 1, there are many alternative embodiments of the present invention. As one example, an embodiment of the present invention could also be applied to a single antenna system which combines multiple transceivers via passive combiners, splitters, or diplexers. These transceivers could be designed to implement either the same or different communication standards/protocols. Some examples of devices/systems capable of implementing such embodiments include, but are not limited to:

Dual band (2.4 and 5 GHz) IEEE 802.11 Single Input Single Output (SISO) devices/systems with separate transceivers for each band sharing a single antenna via a passive diplexer. Possible options include retuning the 5 GHz transceiver to operate at 2.4 GHz, retuning the 2.4 GHz transceiver to operate at 5 GHz, or using the second harmonic of the 2.4 GHz signal.

IEEE 802.11ac systems/devices that implement the 80+80 MHz channel mode using separate transceivers for each 80 MHz channel, where the signals are then passively combined via couplers (on transmit) and via splitters (on receive). Both transceivers can be tuned to the same frequency with one operating in transmit mode and the other in receive mode.

Combined Bluetooth and 2.4 GHz IEEE 802.11 systems/devices have limited isolation between their radios via the switch and/or coupler used to share an antenna. The different bandwidths and capabilities of the transceivers limit the calibrations that can be performed, but this technique should still be useful for calibrations such as LNA gain steps and phase changes.

Depending on the embodiment of the present invention, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof.

The one or more non-transitory computer-readable media and/or means for implementing/performing one or more operations/steps of an embodiment of the present invention may include, without limitation, application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals (e.g., by being encoded as part of a carrier wave or included as part of an analog or digital propagated signal) on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read; punch cards, paper tape, any other physical medium with one or more patterns of holes, or any other non-transitory medium from which a computer instruction can be read.

Depending on the embodiment of the present invention, some or all of the steps and/or operations may be implemented or otherwise performed, at least in part, on a mobile device. "Mobile device" as used herein refers to any mobile or otherwise portable electronic device having multiple transceivers, including, but not limited to, multimedia players, communication devices, computing devices, navigating devices, etc. Thus, mobile devices include (but are not limited to) laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

While several embodiments of the present invention have been shown and described herein, it will be understood by those of ordinary skill in the art that various changes in form and details may be made therein without departing from the spirit and scope of the present invention—i.e., the invention is not limited to any embodiments described herein, but is defined by the appended claims and their equivalents.

What is claimed is:

1. A method for calibrating one or more transceiver components in a multi-transceiver system, comprising:
   sending a calibration signal through a transmit path of a first transceiver in the multi-transceiver system;
   transmitting, by an antenna of the first transceiver, the calibration signal output from the transmit path of the first transceiver;
   receiving, by an antenna of a second transceiver in the multi-transceiver system, the transmitted calibration signal;
   sending the received calibration signal through a receive path of the second transceiver; and
   processing the calibration signal output from the receive path of the second transceiver to calibrate at least one of a Digital-to-Analog Converter (DAC) and a Power Amplifier (PA) in the transmit path of the first transceiver in the multi-transceiver system.

2. The method of claim 1, wherein the calibration signal is modulated.

3. The method of claim 1, wherein transceivers of the multi-transceiver system transceive signals modulated in accordance with a Multiple Input Multiple Output (MIMO) communication technique.

4. The method of claim 1, wherein at least one of gain step size, gain step phase change, and pre-distortion of the PA in the transmit path of the first transceiver is being calibrated.

5. The method of claim 1, further comprising:
   processing the calibration signal output from the receive path of the second transceiver to calibrate one or more transmit filters in the transmit path of the first transceiver.

6. The method of claim 1, further comprising:
   processing the calibration signal output from the receive path of the second transceiver to calibrate at least one of an amplitude and phase imbalance between in-phase and quadrature transmission signals of the first transceiver.

7. The method of claim 1, further comprising:
   processing the calibration signal output from the receive path of the second transceiver to calibrate at least the LNA of the receive path of the second transceiver,
   wherein at least one of gain step size, gain step phase change, and frequency tuning of the LNA in the receive path of the second transceiver is being calibrated.

8. The method of claim 1, further comprising:
   processing the calibration signal output from the receive path of the second transceiver to calibrate one or more receive filters in the receive path of the second transceiver.

9. The method of claim 1, further comprising:
   processing the calibration signal output from the receive path of the second transceiver to calibrate at least one of an amplitude and phase imbalance between in-phase and quadrature signals of the receive path of the second transceiver.

10. The method of claim 7, wherein the mixer in the receive path of the second transceiver is being calibrated to reduce second-order intermodulation products.

11. The method of claim 1, wherein transceivers of the multi-transceiver system transceive signals modulated in accordance with an Institute of Electrical and Electronics Engineers (IEEE) 802.11 communication standard.

12. The method of claim 1, wherein transceivers of the multi-transceiver system share a single Local Oscillator (LO).

13. The method of claim 1, wherein transceivers of the multi-transceiver system share a timing reference signal.

14. A multi-transceiver device, comprising:
   a first transceiver comprising a transmit path;
   a second transceiver comprising a receive path; and
   one or more processors; and
   at least one non-transitory computer-readable medium having program instructions recorded thereon, the program instructions configured to have the one or more processors perform the steps of:
      sending a calibration signal through the transmit path of the first transceiver;

transmitting, by an antenna of the first transceiver, the calibration signal output from the transmit path of the first transceiver;

receiving, by an antenna of the second transceiver, the transmitted calibration signal;

sending the received calibration signal through the receive path of the second transceiver; and processing the calibration signal output from the receive path of the second transceiver to calibrate at least one of a Digital-to-Analog Converter (DAC) and a Power Amplifier (PA) in the transmit path of the first transceiver of the multi-transceiver system using the received and processed calibration signal.

15. The multi-transceiver device of claim 14, wherein the calibration signal is modulated.

16. The multi-transceiver device of claim 14, wherein the multi-transceiver device uses a Multiple Input Multiple Output (MIMO) communication technique.

17. The multi-transceiver device of claim 14, wherein at least one of gain step size, gain step phase change, and pre-distortion of the PA in the transmit path of the first transceiver is being calibrated.

18. The multi-transceiver device of claim 14, wherein the program instructions are further configured to have the one or more processors calibrate at least one of an amplitude and phase imbalance between in-phase and quadrature transmission signals of the first transceiver.

19. The multi-transceiver device of claim 14, wherein the program instructions are further configured to have the one or more processors process the calibration signal output from the receive path to calibrate at least one of gain step size, gain step phase change, and frequency tuning of the LNA in the receive path of the second transceiver.

20. The multi-transceiver device of claim 14, wherein the program instructions are further configured to have the one or more processors process the calibration signal output from the receive path to calibrate the receive mixer to reduce second-order intermodulation products.

21. The multi-transceiver device of claim 14, wherein the program instructions are further configured to have the one or more processors calibrate at least one of an amplitude and phase imbalance between in-phase and quadrature signals of the receive path of the second transceiver.

22. The multi-transceiver device of claim 14, wherein transceivers of the multi-transceiver system transceive signals modulated in accordance with an Institute of Electrical and Electronics Engineers (IEEE) 802.11 communication standard.

23. The multi-transceiver device of claim 14, wherein transceivers of the multi-transceiver system share at least one of a single Local Oscillator (LO) and a timing reference signal.

24. A method for calibrating one or more transceiver components in a multi-transceiver system, comprising:

sending a calibration signal through a transmit path of a first transceiver in the multi-transceiver system, resulting in transmission of the calibration signal by an antenna of the first transceiver;

receiving, by an antenna of a second transceiver in the multi-transceiver system, the transmitted calibration signal, and sending the received calibration signal through a receive path of the second transceiver;

processing the received calibration signal in order to calibrate at least one of a Digital-to-Analog Converter (DAC) and a Power Amplifier (PA) in the transmit path of the first transceiver of the multi-transceiver system; and processing the received calibration signal in order to calibrate at least one of a Low Noise Amplifier (LNA), a mixer, and an Analog-to-Digital Converter (ADC) in the receive path of the second transceiver of the multi-transceiver system.

25. The method of claim 24, wherein transceivers of the multi-transceiver system transceive signals modulated in accordance with a Multiple Input Multiple Output (MIMO) communication technique.

26. The method of claim 24, further comprising:
processing the received calibration signal in order to calibrate one or more transmit filters in the transmit path of the first transceiver.

27. The method of claim 24, further comprising:
processing the received calibration signal in order to calibrate at least one of an amplitude and phase imbalance between in-phase and quadrature transmission signals of the first transceiver.

28. The method of claim 24, further comprising:
processing the received calibration signal in order to calibrate one or more receive filters in the receive path of the second transceiver.

29. The method of claim 24, further comprising:
processing the received calibration signal in order to calibrate at least one of an amplitude and phase imbalance between in-phase and quadrature signals of the receive path of the second transceiver.

30. The method of claim 24, wherein the mixer in the receive path of the second transceiver is being calibrated to reduce second-order intermodulation products.

31. The method of claim 24, wherein the calibration of at least one of the DAC and PA in the transmit path of the first transceiver of the multi-transceiver system is performed at a different time than the calibration of at least one of the LNA, the mixer, and the ADC in the receive path of the second transceiver of the multi-transceiver system.

32. The method of claim 24, wherein transceivers of the multi-transceiver system transceive signals modulated in accordance with an Institute of Electrical and Electronics Engineers (IEEE) 802.11 communication standard.

33. The method of claim 24, wherein transceivers of the multi-transceiver system share a single Local Oscillator (LO).

34. The method of claim 24, wherein transceivers of the multi-transceiver system share a timing reference signal.

* * * * *